INVENTORS.
ROBERT A. WONDER &
WOODROW D. HARRIS
BY

ATTORNEY

May 11, 1965 R. A. WONDER ETAL 3,182,560
SIZING STACKED TILES AND EQUIPMENT THEREFOR
Filed Jan. 15, 1963 9 Sheets-Sheet 2

INVENTORS.
ROBERT A. WONDER &
WOODROW D. HARRIS
BY
ATTORNEY

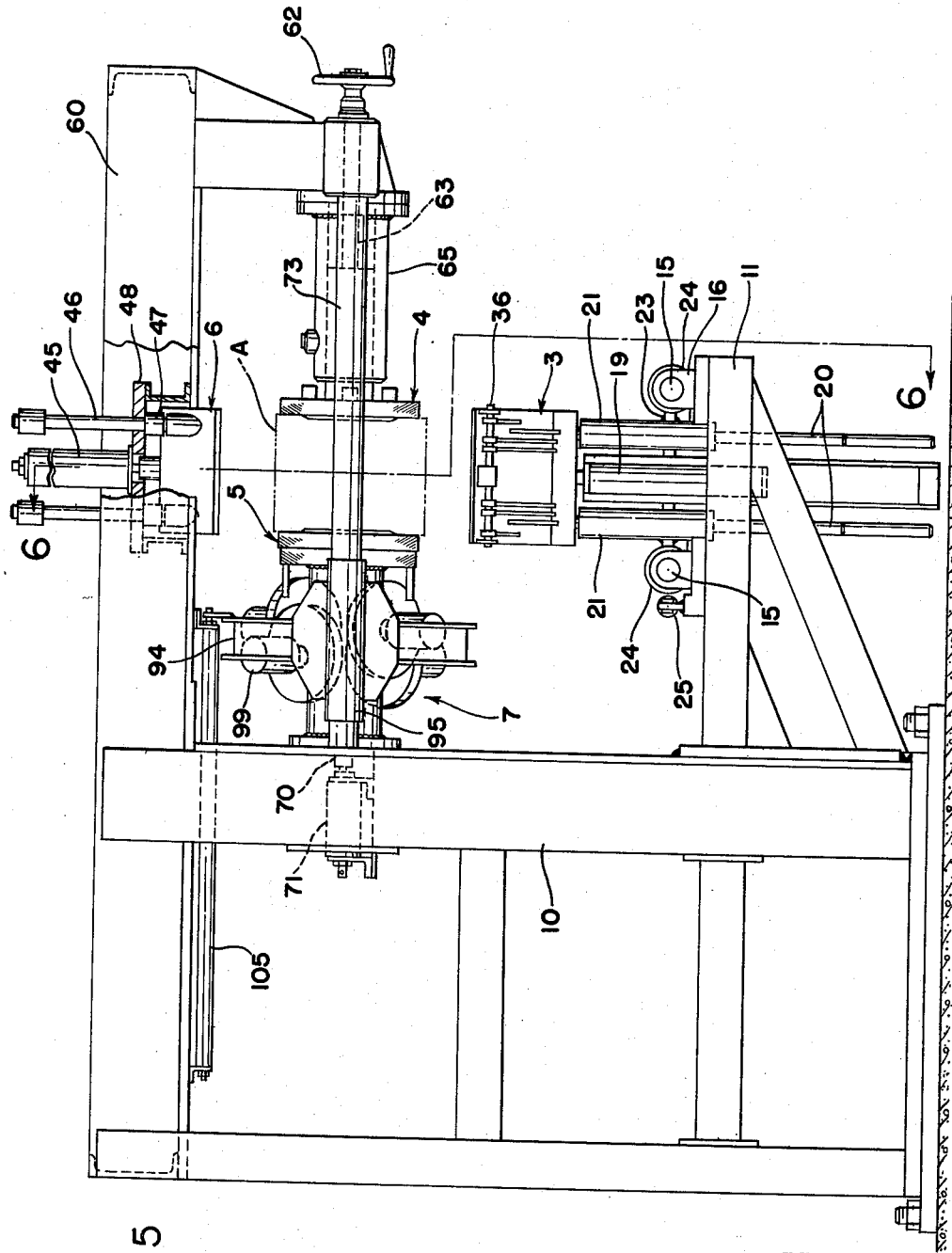

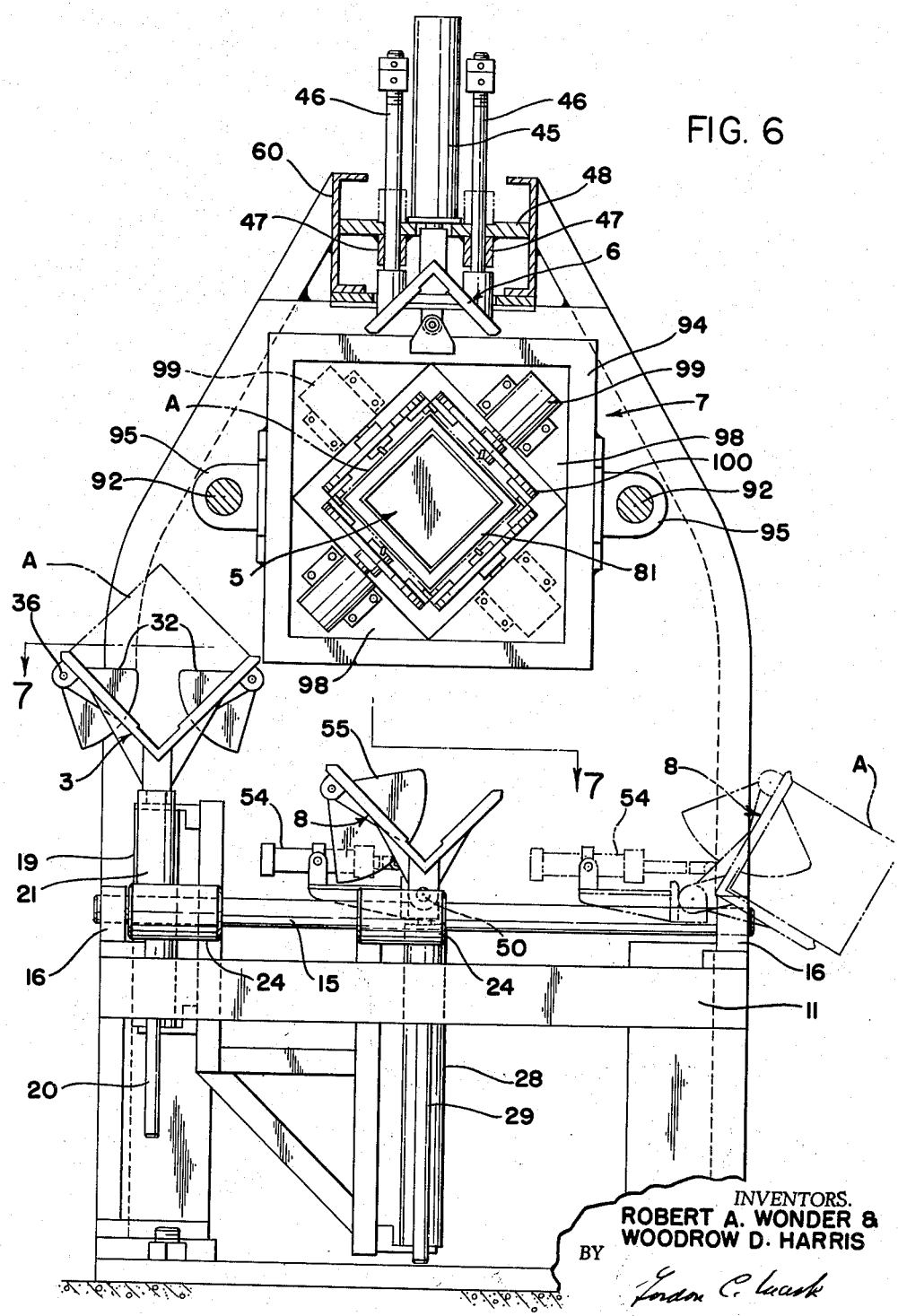

INVENTORS.
ROBERT A. WONDER &
WOODROW D. HARRIS
BY
ATTORNEY

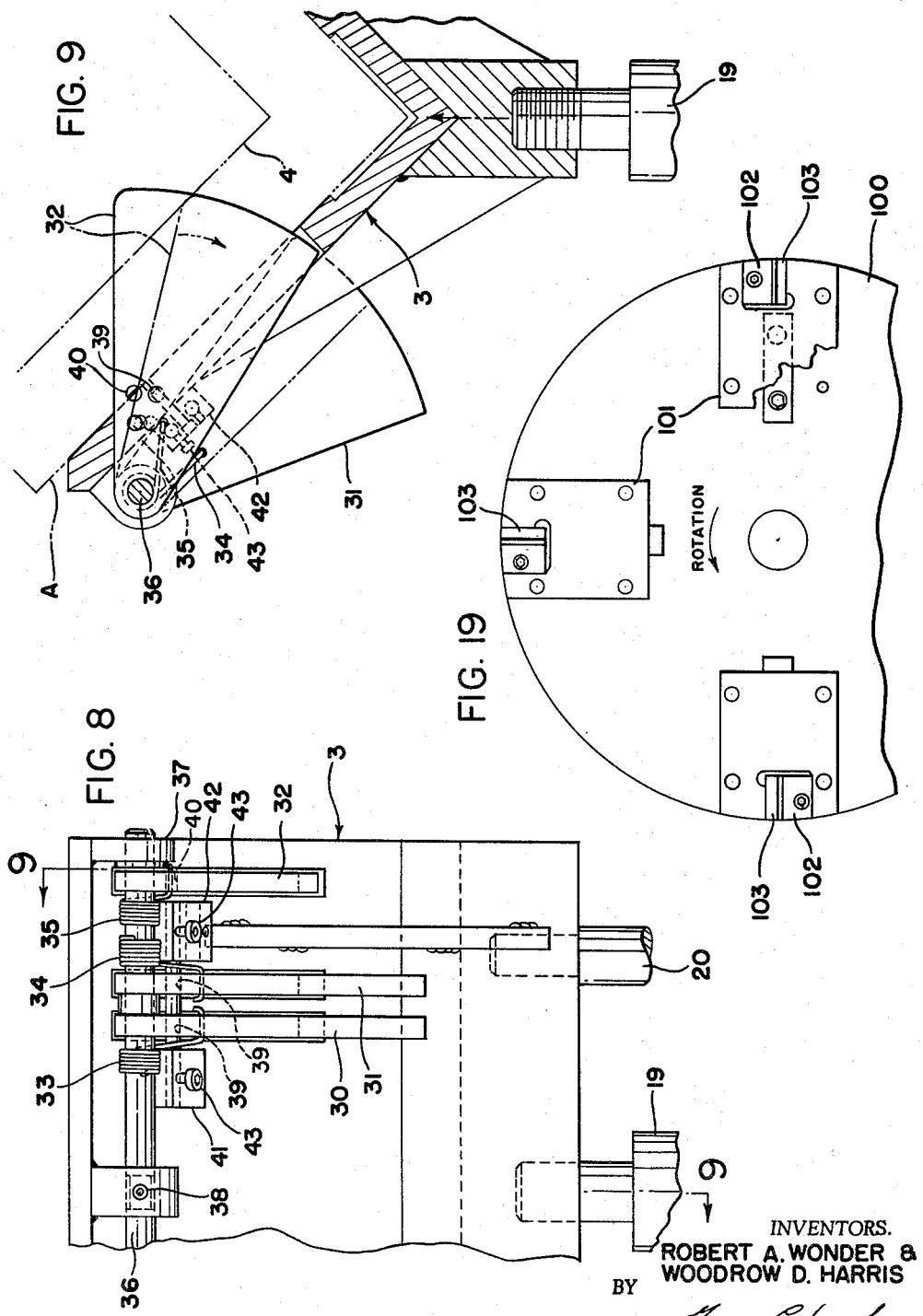

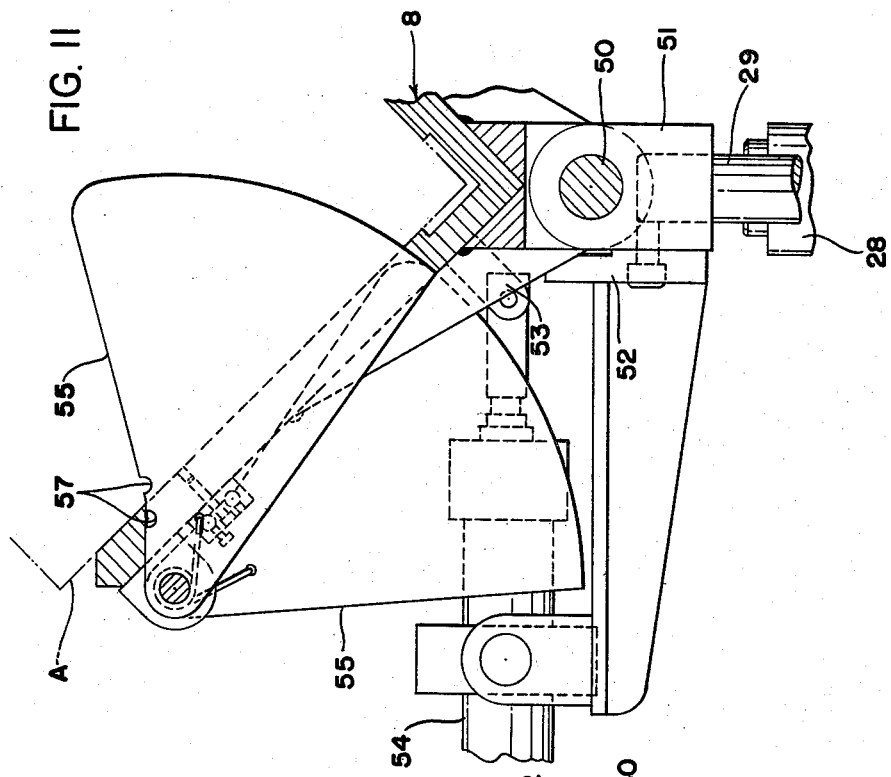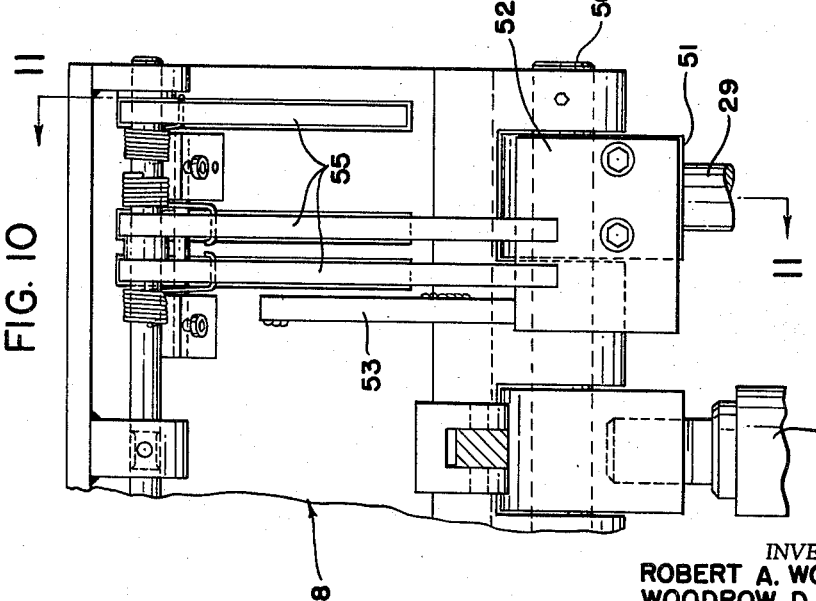

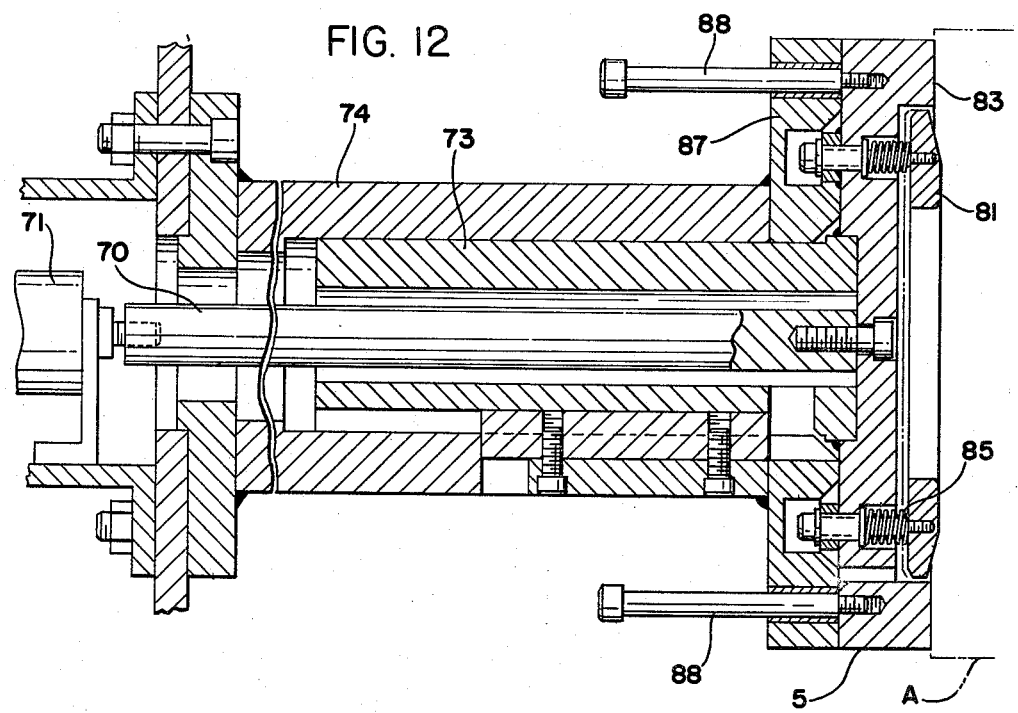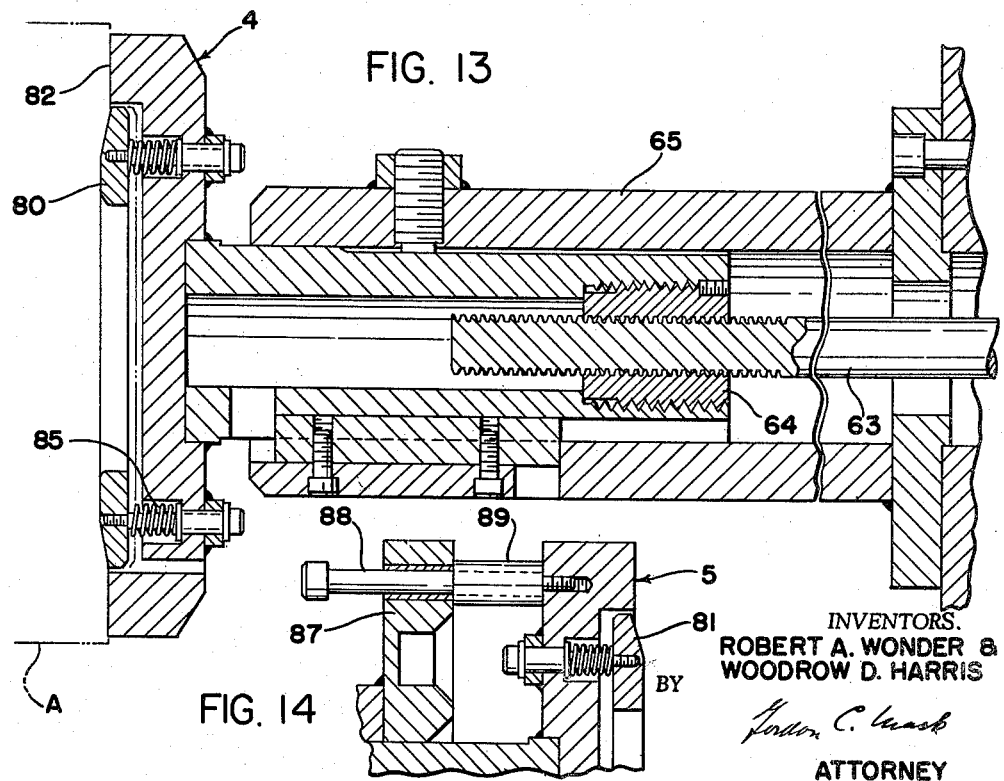

INVENTORS.
ROBERT A. WONDER &
WOODROW D. HARRIS
BY
ATTORNEY

United States Patent Office

3,182,560
Patented May 11, 1965

3,182,560
SIZING STACKED TILES AND EQUIPMENT
THEREFOR
Robert A. Wonder, Akron, and Woodrow D. Harris,
Stow, Ohio, assignors to Ensine Corporation, Tallmadge, Ohio, a corporation of Ohio
Filed Jan. 15, 1963, Ser. No. 251,524
6 Claims. (Cl. 90—15)

This invention relates to sizing stacked tiles, and equipment therefor.

The tiles may be of vinyl resin, fiber, etc. They are cut to their approximate final size, and then trimmed in a final sizing step. They are usually square, but may be rectangular, and more generally may be any shape with flat sides. The invention will be described more particularly as applied to a stack of square tiles.

It is customary to size stacks of eighty tiles, but the number of tiles in a stack is immaterial. The tiles may vary in thickness. This specification relates more particularly to equipment for stacking tiles of any one of three different thicknesses, namely 0.060, 0.080 and 0.125 inch. Eighty tiles of these respective thicknesses form stacks 4.8, 6.4 and 10 inches thick. The equipment is designed to handle stacks of these different sizes.

The invention will be described more particularly in connection with the stacking of square tiles.

The cutters used in sizing are mounted on discs, with one or more cutters on each disc. If the tiles are square, the four discs required to size the tiles are mounted to form an open square so as to size all four sides of the tiles simultaneously. Each disc is rotated on its own axis across the entire surface of its side of the stack.

The invention includes novel cradles for conveying a stack of the tiles to and from the sizing location, novel clamping mechanism used during sizing, and novel means for accomplishing the movement of the cutters over the sides of the stack. The various novel features will be evident from the description which follows.

The invention will be described more fully in connection with the accompanying drawings which relate to trimming square tiles. In the drawings:

FIGURE 5 is a front elevation with the cutters in full retracted or static position, with parts broken away;

FIGURE 6 is an end elevation taken on line 6—6 of FIGURE 5, showing in phantom lines tiles loaded to be sized, and sized tiles being dumped;

FIGURE 8 is an enlarged fragmentary elevation of FIGURE 5 showing the loading cradle with the inner two sets of end supports locked down;

FIGURE 9 is a section on line 9—9 of FIGURE 8 showing the outer end support held in the "UP" position by a torsion spring;

FIGURE 10 is a fragmentary elevation similar to FIGURE 8, but of the unloading cradle with the pivot and stop arrangement for dumping this cradle;

FIGURE 11 is a section on line 11—11 of FIGURE 10, showing one holding arm of the unloading cradle in the "UP" position and also showing the pivot and stop means in section, together with a cylinder for dumping the cradle;

FIGURES 12 and 13 are enlarged axial cross sections through the tile clamping means, with FIGURE 12 showing the clamping cylinder retracted and FIGURE 13 showing the hand-wheel adjustment;

FIGURE 14 is a detail of the structure shown in FIGURE 12, but with a spacer extending the clamping head for use in sizing thinner gauge tiles;

FIGURE 19 is a fragmentary elevation of one of the discs.

The tiles are received at the machine after being generally cut to a square shape. They are slightly oversize. They are stacked as they are manually loaded into a loading cradle. The operation of moving them into the sizing location, sizing them, and then removing them is generally illustrated schematically in FIGURES 1-4.

Throughout the application, a stack of tiles is identified by the letter A. In FIGURES 1-4 the designation $A_1$ is used to identify an unsized stack of tiles, and the designation $A_2$ to designate a sized stack.

Figure 1:
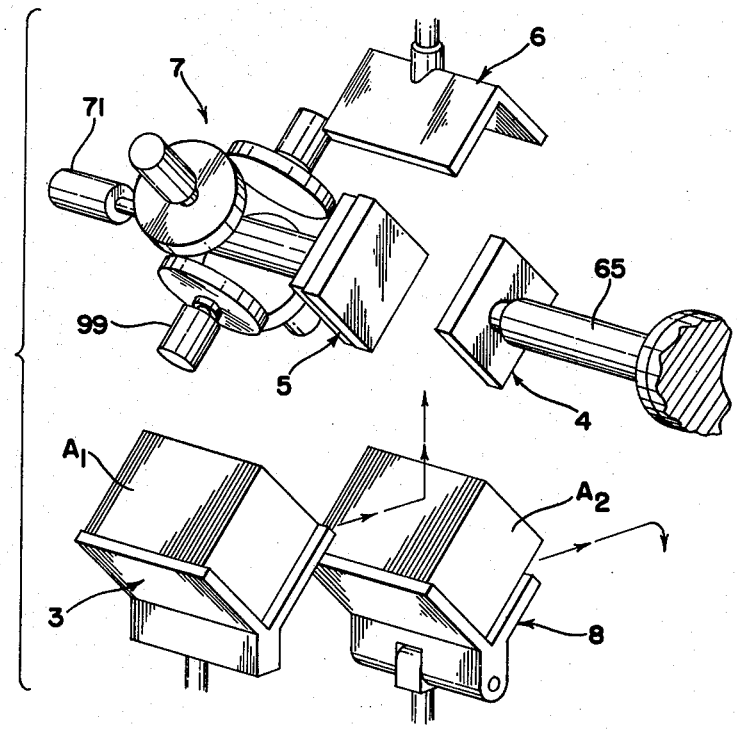
FIGURE 1 is a schematic perspective view showing a stack of unsized tiles approaching the clamping means in which they are held while being sized, and a stack of sized tiles being conveyed away from the clamping means.
Figure 2:
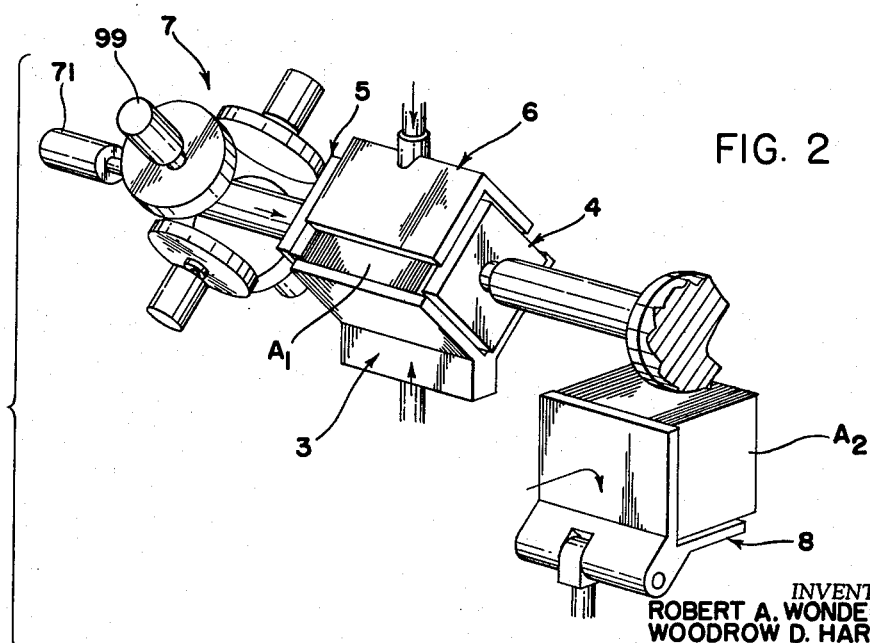
FIGURE 2 is a view similar to FIGURE 1 but at a later stage of the cycle, showing the stack of unsized tiles in the clamping means prior to being clamped, and the stack of previously sized tiles being conveyed away from the clamping means.
Figure 3:
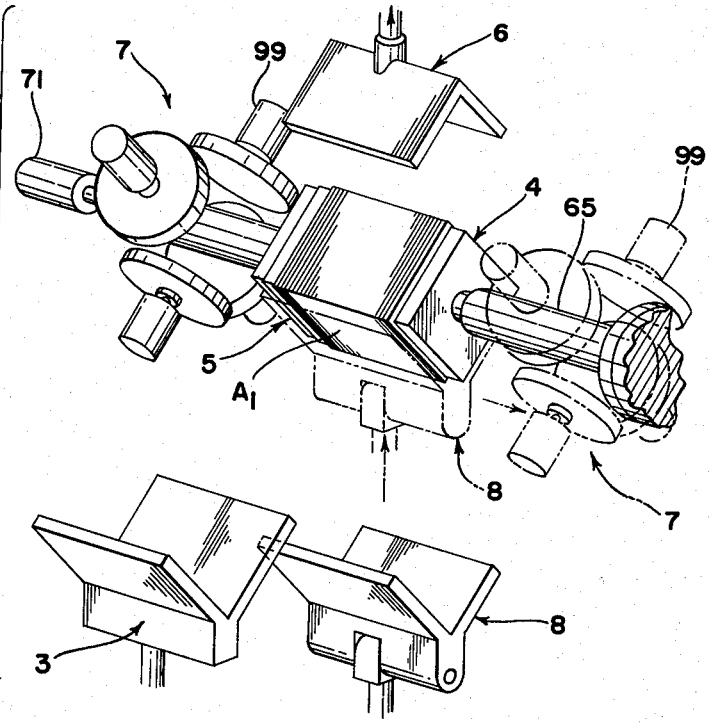
FIGURE 3 is a similar view, but at a later stage in which the stack of unsized tiles is held by the clamps, with the cutters in position to be passed over the tiles.

The unsized tiles are manually stacked as they are loaded into the loading cradle 3. This moves them between the clamping members 4 and 5 of the clamping device. The centering head 6 has been lowered into register position (FIGURE 2) and the loading cradle moves the stack into the centering head. Then the clamping members are closed on the stack and the loading cradle and centering head are separated from the stack (FIGURE 3). FIGURE 3 shows the cutter head 7 in position to be passed over the stack $A_1$.

Figure 4:
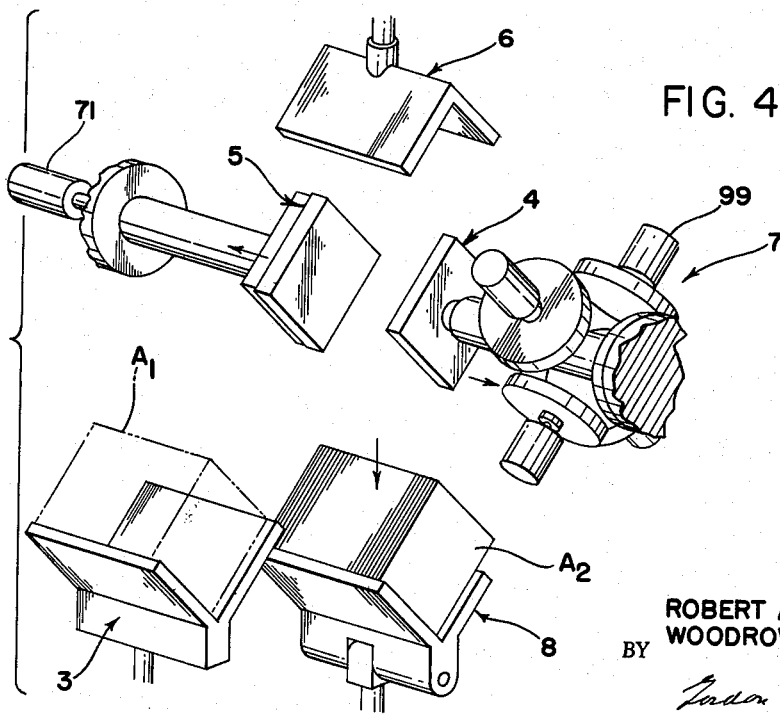
FIGURE 4 is a similar view after the cutters have sized the tiles.

After the cutter head is passed over the stack, the unloading cradle 8 is moved up under the sized stack as shown in phantom in FIGURE 3. FIGURE 4 shows the elements in their final position with the sized stack $A_2$ removed from the clamp. The cutter head is then returned to its original position and the operation is repeated by unloading the sized stack $A_2$ from the unloading cradle, loading a fresh unsized stack $A_1$ into the loading cradle, and then moving this into the sizing location.

It is to be noted that in this operation all four sides of the stack are cut simultaneously to their final size.

We now turn to the drawings of the equipment. Several pressure cylinders are utilized. These may be driven by oil or pneumatically. The piping to and from these cylinders is of any usual type. The valves for operating the cylinders may be operated manually or through a suitable time-control unit, or they may be operated in sequence automatically. Any suitable means for operating the different units of the equipment may be provided. FIGURE 5 is a front elevation which shows one of the two upright frame members 10 which support the cradle platform 11.

The carriage for the loading and unloading cradles is supported by the guide rods 15 mounted in journals 16 which are supported on the platform 11.

The loading cradle 3 is mounted on the double-acting pressure cylinder 19 which is supported on guide rods 20 adapted to be reciprocated in the journals 21. This loading cradle assembly is a part of the carriage 23 which is supported on the guide rods 15 by the journals 24. The carriage is moved back and forth on the guide rods by the double-acting pressure cylinder 25.

Also mounted on the carriage 23 is the unloading cradle 8. This is raised and lowered by the double-acting pressure cylinder 28 and it rides up and down on the guide rods 29.

Thus both the loading cylinder and the unloading cylinder are mounted on the carriage 23 and they are moved back and forth on the guide rods 15, together. They are independently raised and lowered, as will be explained in greater detail in what follows.

There is a similarlity between the loading and unloading cradles and yet they are both quite different in structure because they perform different functions. Each is V-shaped, and each is provided with end supports which are pivotally mounted and are sprung by springs so as to be partially located within the cradle, but each end support can be pressed out of its position within the cradle by pressure against the springs. Because stacks of tiles of different thickness are of different heights, there are several end supports located in differently spaced relations within each cradle and means is provided for locking each of the end supports out of operative position when not being used. The structure of the loading cradle will be explained more fully in connection with FIGURES 8 and 9, and the structure of the unloading cradle will be explained in connection with FIGURES 10 and 11.

Figure 7:
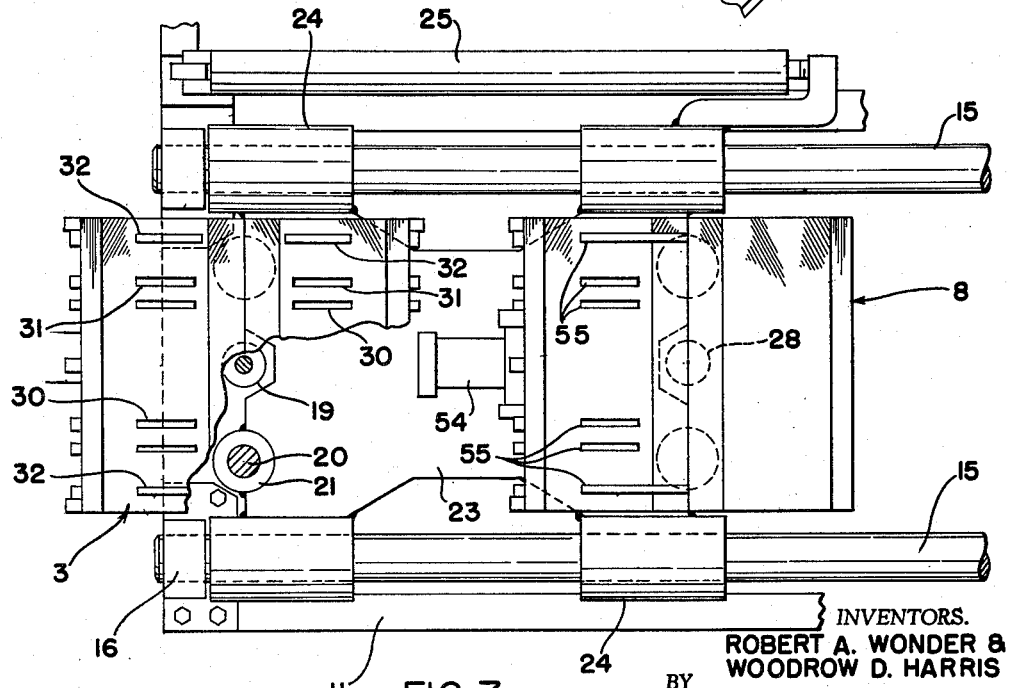
FIGURE 7 is a fragmentary plan view taken along line 7—7 of FIGURE 6 with parts broken away, showing the loading cradle and the unloading cradle, both empty.

Because each cradle is adapted to handle stacks of different sizes, and because for the equipment as designed it is necessary that each stack be held in the middle of its cradle, there are three end supports at each end of each cradle, and in the loading cradle there are end supports in each side of the V-shaped bottom of the cradle. Thus, in FIGURE 8 there are three end supports 30, 31 and 32 shown in one side of the bottom. There are three similarly constructed end supports in the other side of the bottom, and at the other end of the bottom there are six end supports. (See the plan view of the cradle in FIGURE 7.) FIGURE 9 is an end view and shows the end support 32 sprung into operative position, as shown in FIGURE 8. End supports 30, 31 are shown locked out of operative position in FIGURES 8 and 9, and end support 30 is shown out of operative position in FIGURE 8. Both sides of the bottom are similarly constructed and each end of the loading cradle is similarly constructed. Thus there are twelve end supports in the loading cradle.

The end supports 30, 31 and 32 are pressed toward operative position, with a portion within the cradle, by the torsion springs 33, 34 and 35 which are mounted on the rod 36 held in journals 37 at the ends of the loading carrier. Setscrew 38 holds the rod 36 in the journals. In FIGURE 8 the end support 32 is spring-pressed into operative position and the end supports 30 and 31 are locked down out of operative position so as not to interfere with the formation of a stack of tiles or the transfer of a stack of the tiles in and out of the loading cradle. Selected end supports are locked out of operative position by pins inserted through openings 39 in the end supports 30 and 31, and opening 40 in each support 32, these pins being held in the blocks 41 and 42 by setscrews 43. As shown in FIGURES 8 and 9, a long pin has been inserted through the openings 39 in end supports 30 and 31, and is held in both blocks 41 and 42, so that these end supports are locked out of operative position. In order to lock just one of these end supports out of operative position, a shorter pin would be used and held in only one of the blocks 41 or 42— whichever is adjacent that particular end support. End support 32 can be locked out of operative position by passing a pin through opening 40 in the end support and fastening this in the block 42.

Before the loading cradle 3 has lifted a stack of tiles into position between the clamps 4 and 5, the centering head 6 is lowered into register position with the stack by the double-action pressure cylinder 45 under sufficient pressure to press any misaligned tile into position. The centering head is attached to the guide rods 46 which slide in the journals 47 fastened to the supporting frame 48.

The unloading cradle 8 is pivoted on pin 50 in the top block 51. As shown in FIGURE 11, an ear 52 on the stop block is so positioned that the gusset 53 under the cradle 8 rests against it when the unloading cradle is upright. The cylinder 54 is adapted to tip the cradle and unload its sized stack each time the carriage 23 is moved to the extreme right end of the frame (FIGURE 6). Switch means (not shown) is provided for doing this automatically. As soon as the stack has been dumped the cradle is returned to the upright position, either before or during the return trip of the carriage. Thus, as the carriage moves to and fro on the guide arms 15, the unloading cradle is moved from the upright position to the dumping positon, and then back to the upright position. When the cradle is elevated to receive a stack of freshly sized tiles it is in the elevated position.

The end supports 55 in the unloading cradle 8 may be identical with end supports 30, 31 and 32 in the loading cradle, and may be identically mounted and spring pressed. As a variation, FIGURE 11 shows the end supports as notched at 57 for locking by pins, instead of having openings in them.

The clamping and sizing mechanism are supported from the overhead portion 60 of the frame, as well as the upright 10.

The ends of the clamping equipment are operated independently. The clamping member 4 remains stationary except as its position is changed by the hand wheel 62 to widen or narrow the space between the clamping members to accommodate stacks of different heights.

FIGURE 13 is a detail of this mechanism. The hand wheel is mounted on the shaft 63 which is threaded at its inner end through the internally threaded block 64 which slides within the guide tube 65 as the hand wheel is turned in one direction or the other. This moves the clamping member 4 toward and away from the other clamping member 5. The member 4 is moved by the hand wheel to the location required for acceptance of a stack of any particular size.

The clamping member 5 is connected by the piston rod extension 70 to the piston rod within the double-acting pressure cylinder 71 (FIGURE 12) which actuates the clamping member 5. The cylinder of course is stationary. The extension 70 is fastened to the clamping member 5 and this in turn is fastened to the sleeve 73 which slides within the guide tube 74.

Compression plates 80, 81 are located in the clamping members. Their edges are beveled. The compression plates are held out from the clamp faces 82 and 83 of the clamping members 4 and 5, respectively, by the springs 85. When pressure is applied to these compression plates, as will be explained in what follows, they are depressed so that their outer surfaces are flush with the clamp faces 82 and 83.

Figure 15:
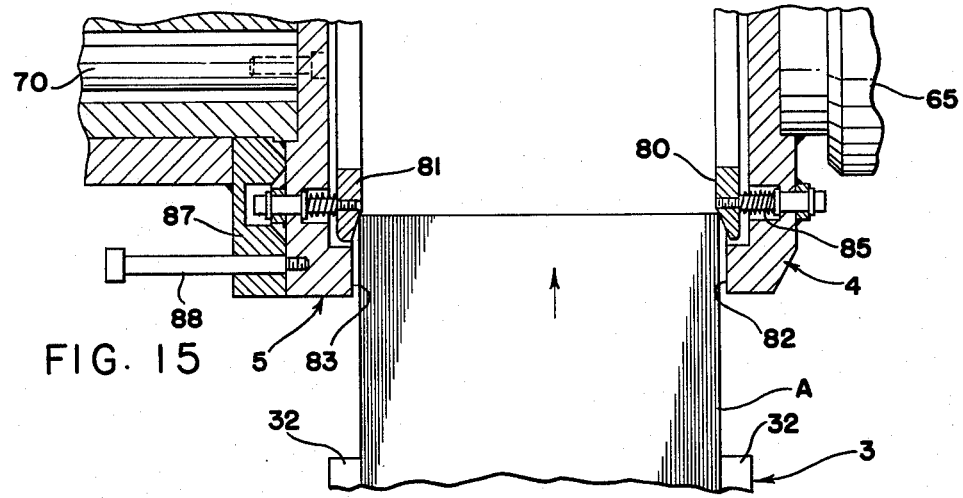
FIGURE 15 is a detail showing a stack of tiles entering between the clamping members of the clamp.
Figure 16:
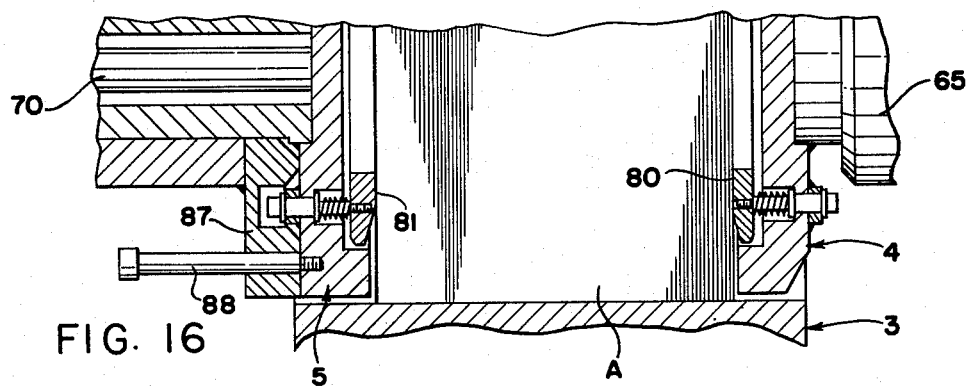
FIGURE 16 is a view of the same after the stack has been positioned between the clamps.
Figure 17:
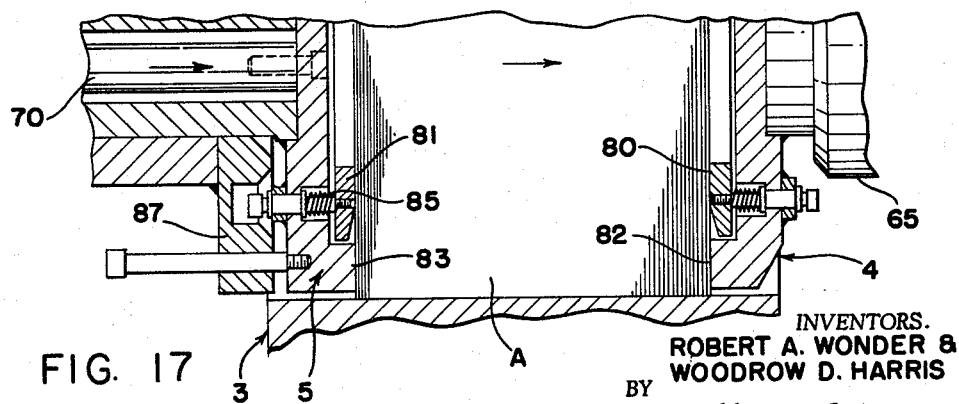
FIGURE 17 is a view of the same with the stack held by the clamps.

FIGURE 15 shows a stack of unsized tiles, held in the cradle 3, being elevated into position between the clamping members. The clamping member 4 has been set for a particular size of stack and the end supports have been set for this same size of stack. For stacks of different heights, the clamping member 5 is spaced different distances from the end plate 87 fastened to rod 70 by first removing the bolts 88 from member 5, placing a tubular spacer 89 (FIGURE 14) of predetermined length over each bolt, and then replacing the bolts. Thus, the clamping members are always centered above a stack, regardless of the height of the stack. Assume that the equipment is adjusted to receive the largest stack, and the end members 32 are in operative position within the cradle, as in FIGURES 8 and 9. As the stack A is raised, it slides up between compression plates 80 and 81. As it continues its rise into contact with the centering head 6, the four end supports 32 contact the clamping members 4 and 5 and are depressed against the pressure of the springs, to a position flush with the slanted bottoms of the cradle.

The stroke of the piston rod 71 is not great. It is just sufficient to move the clamping member 5 into and out of contact with the ends of the stack. The clamping member 4 which has been brought to the desired position by the hand wheel remains stationary, so the entire clamping movement is effected by the piston rod 71. Its travel is usually no more than ¼ inch. FIGURE 12 shows the relation of the parts as the clamping member 5 is being moved into position. FIGURE 14 shows the relation of the parts after the piston 71 has been retracted into the cylinder.

Figure 18:
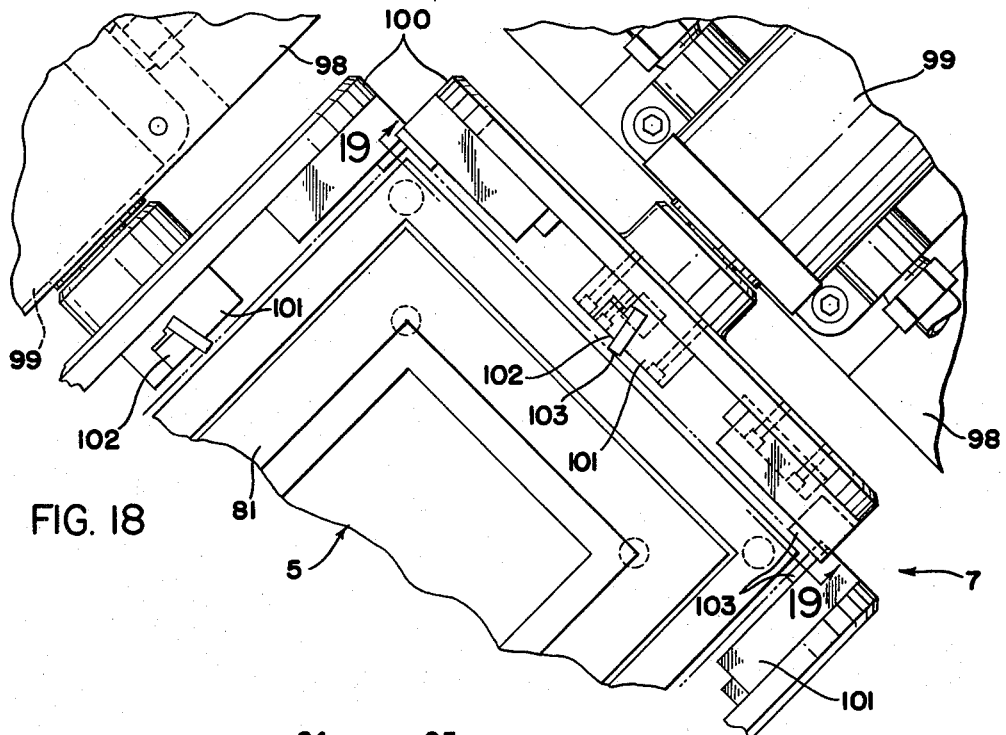
FIGURE 18 is an enlarged detail showing the tile cutters, their mounting blocks and the arrangement of the discs on which the tile cutters are mounted.

The cutter head 7 is supported on journals 95 adapted to move back and forth on the guide rods 92. It comprises the frame 94 supported between the journals 95 which slide on the guide rods 92. Within the frame are the four mounting gussets 98 on which the four hydraulic motors 99 are mounted, two on one side of each of two gussets and two on the other side of two other gussets, so that the widest parts of the respective cutter discs are not all in the same plane but are offset from one another so that they do not make contact (FIGURE 18).

There are four rotating cutter discs 100, one driven by each of the motors. As seen in FIGURE 19, there are preferably several cutters on each cutter disc. Each cutter includes a cutter block 101 fastened to the disc, in which there is a wide slot in which the cutter wedge block 102 is mounted, and this holds the cutter blade 103. As shown in FIGURE 6, the blades 103 project out from the discs 100 and trim away the edges of the stack being sized. As the discs rotate the double-acting pressure cylinder 105 (FIGURE 5) moves the cutter head longitudinally over the stack, and as the cutter head moves over the stack the rotating cutters trim each of the four sides to the desired final size simultaneously. As shown in FIGURE 3, the cutter head moves from one end to the other of the stack during the cutting operation. The cutter head moves over the stack in one direction, with the cutter blades sizing all four sides of the tiles simultaneously. The tiles are lowered on the unloading cradle while the cutter head is still in this forward position. The cutter head is reutrned to its starting position before the centering head 6 is lowered to contact a new stack of tiles.

In sizing a stack of tiles, the operator manually loads one carton, e.g. eighty of the tiles, into the loading cradle. This fills the space between the end plates. He then pushes start buttons which actuate the cylinder 25 which moves the carriage 23 and the cylinder 45 which lowers the centering head 6. At the end of the stroke of cylinder 25 which substantially coincides with the end of the stroke of cylinder 45 the operator pushes the start button for cylinder 19 or this is controlled by a timing switch. It lifts the loading cradle and the stack of tiles against the centering head, bringing the stack into the correct position between the clamping heads 4 and 5.

At the end of the stroke of cylinder 19 the operator pushes the start button for the piston 71, or this is controlled by a timing switch. It moves the clamping head 5 against the stack and thus positions the stack firmly between the clamping heads 4 and 5. Cylinders 19 and 45 are then retracted and cylinder 25 is retracted moving the loading carriage out from under the finished tiles and moving the unloading carriage under the finished tiles. Cylinder 105 is actuated as soon as the centering head 6 has been moved to its "UP" position, and this moves the cutter head over the stack, cutting the four sides of the tiles to size simultaneously. Cylinder 28 is now actuated to lift the unloading cradle against the bottom of the sized stack of tiles. Piston 71 is now retracted and the stack supported in the unloading cylinder is lowered by retracting the piston of cylinder 28. When the unloading cradle has reached its down position, the cutter head returns to the starting position and cylinder 25 is again actuated and the cycle is repeated. This moves the unloading cylinder to the right, and the cradle is tipped for unloading the tiles.

It is obvious that the entire mechanism can be operated from one control switch with proper timing, if desired.

The invention is covered in the claims which follow.

What we claim is:

1. Tile-sizing means which comprises means for clamping a stack of rectangular tiles at the ends thereof, a cutter head which comprises four rotary cutter discs facing one another spaced to accommodate the stack between them with the individual tiles perpendicular to all of the discs, each of the discs being larger in diameter than each of the respective sides of the tiles, at least one cutter in each disc, means for rotating the cutter discs and for moving the cutter head and stack relatively to one another whereby to trim the edges of the tiles by the cutters.

2. The sizing means of claim 1 in which the clamping means comprises compression plates adapted to contact the ends of the stack, and means for bringing said plates and the ends of the stack into contact with one another.

3. The combination of claim 2 in which a first compression plate is adjustable with respect to the location at which it is adapted to contact its end of the stack, and means is provided for moving the other compression plate toward and away from the first compression plate.

4. The combination of the tile-sizing means of claim 2 and supply means for supplying a stack of tile thereto, which supply means includes a support for a stack of tile when stacked on edge on the support means, end supports depressible into the support which are located on the support slightly farther apart than the height of a stack, and means for moving the supply means and tile-sizing means into operative relation and thereby bringing the compression plates of the latter and the end supports into pressure contact whereby the end supports are depressed at least partially into the support.

5. A clamp with two opposed clamping members for holding a stack of tiles, means connected with the first member for manually moving that clamping member toward and away from the other clamp member, a double-acting pressure cylinder for moving said other clamp member toward and away from the first clamp member, and in combination with the clamp a cutter head with four cutting discs, each disc being perpendicular to its two adjacent discs, and means for moving the cutter head over the clamp with the cutting discs adapted to be in cutting contact with the sides of a stack of tiles when held by the clamp.

6. In combination with means for trimming the edges of a stack of tiles, two clamping members adapted to clamp the stack of tiles between them in trimming position, each clamping member being rectangular and somewhat smaller in area than the tiles the location of the first clamping member being manually adjustable and adapted to remain stationary in its adjusted position, mechanical means for moving the second clamping member toward and away from the first clamp member, means for adjusting the distance between said second clamping member and said means for moving it mechanically, a loading cradle which provides an upwardly facing right-angular support for the stack of tiles between the clamping members and a downwardly facing right-angular centering head adapted to cooperate with said cradle to align the tiles in the cradle, and means for moving the clamping means and trimming means relatively to one another with the trimming means surrounding the clamping means.

References Cited by the Examiner
UNITED STATES PATENTS

| | | | |
|---|---|---|---|
| 1,188,339 | 6/16 | Sinderson | 90—16 |
| 1,280,218 | 10/18 | Hawthorne | 90—18 |
| 1,576,332 | 3/26 | Kessler | 90—16 |
| 1,668,530 | 5/28 | Romine | 214—152 |
| 1,698,637 | 1/29 | Kessler | 90—16 |
| 1,766,645 | 6/30 | Johnsson | 198—19 |
| 1,879,692 | 9/32 | Kearney et al. | 90—16 |
| 2,260,883 | 10/41 | Castle | 269—87.1 |
| 2,312,355 | 3/43 | Oberhoffken. | |
| 2,505,801 | 5/50 | Smith | 269—87.1 |
| 2,593,811 | 4/52 | Swinehart. | |
| 2,631,500 | 3/53 | Wigton et al. | 90—15 |
| 2,645,253 | 7/53 | Wilson | 142—20 |
| 2,698,556 | 1/55 | Beauloye et al. | 90—15 |
| 2,758,696 | 8/56 | Eyler | 198—19 |
| 2,826,125 | 3/58 | Dougherty | 90—18 X |
| 2,875,661 | 3/59 | Coudrey | 82—5 |
| 3,044,641 | 7/62 | Code | 214—152 |
| 3,047,166 | 7/62 | Lamp et al. | |
| 3,062,388 | 11/62 | Hunter. | |

WILLIAM W. DYER, Jr., *Primary Examiner.*

UNITED STATES PATENT OFFICE
CERTIFICATE OF CORRECTION

Patent No. 3,182,560

May 11, 1965

Robert A. Wonder et al.

It is hereby certified that error appears in the above numbered patent requiring correction and that the said Letters Patent should read as corrected below.

Column 4, line 11, for "top" read -- stop --; column 6, line 67, for "clamp" read -- clamping --.

Signed and sealed this 28th day of September 1965.

(SEAL)
Attest:

ERNEST W. SWIDER
Attesting Officer

EDWARD J. BRENNER
Commissioner of Patents